United States Patent Office 3,555,129
Patented Jan. 12, 1971

---

3,555,129
METHOD OF FORMING MOISTURE PERMEABLE SELF-SUSTAINING AND COATING FILMS
Kazuo Fukada, Takarazuka, Yoshiaki Sakata, Nishi Yodogawa-ku, Yoshio Yamada, Minami-ku, Masaaki Mizuno, Amagasaki, and Hiroaki Tanaka, Ibaraki, Japan, assignors to The Toyo Rubber Industry Co., Ltd., Osaka, Japan
No Drawing. Filed July 12, 1967, Ser. No. 652,731
Claims priority, application Japan, July 22, 1966, 41/48,244
Int. Cl. B29d 27/04
U.S. Cl. 264—41
6 Claims

ABSTRACT OF THE DISCLOSURE

In a process for producing moisture permeable polymer films by coating polymer solution on a substrate, coagulating with a non-solvent which is miscible with the polymer solvent, and washing to remove the solvent, the improvement comprising facilitating the washing by incorporating in the polymer solution a particulate solid material, the particles of which have dimensions such that the smallest dimensions of the particles are at least 0.1 micron and the largest dimensions are not in excess of 300 microns. Suitable materials are, e.g., calcium carbonate, magnesium carbonate, iron oxide, titanium oxide, milled pulp and cellulose crystallite.

BACKGROUND OF THE INVENTION

(1) Field of the invention

This invention relates to a method of forming moisture-permeable self-sustaining films and coating films from polymeric material which is characterized by incorporation of a specific finely divided solid material having particles the smallest dimensions of which are not less than 0.1 micron and the largest dimensions of which are not greater than 300 microns in a solution of the polymeric material to reduce the processes of manufacture and to obtain products having good external appearance and moisture permeability.

(2) Description of the prior art

Hitherto, moisture permeable self-sustaining or coating films have been made out of polymeric materials generally by a method which comprises casting or coating a solution of the polymeric material on a metallic plate, plate glass, synthetic resin sheet or like support or on a woven fabric, nonwoven fabric or like base material, immediately thereafter or after exposure to air, soaking the resulting cast or coating film on the support or base material in a liquid which is non-solvent for said polymeric material and support or base material, but which is miscible with the solvent employed for said polymeric material, to coagulate said polymeric material into a porous coating film on said support or base material, subsequently thoroughly washing the resulting porous film with a non-solvent to substantially completely eliminate the solvent from the porous coating film, and squeezing and drying the porous film.

However, in the manufacture of porous or moisture permeable self-sustaining or coating films by such a prior method, if the porous coagulated film contains a substantial quantity of residual solvent in the drying step, the porous structure will be destroyed by the action of the remaining solvent with elevation of the temperature of the coating film itself as the drying advances. This phenomenon is remarkable in cases where the solvent employed has a higher boiling point than the non-solvent employed, and leads to a decrease in the moisture permeability and external appearance, especially surface smoothness, of the resulting film. Accordingly, to prevent such a phenomenon, it is necessary to sufficiently eliminate the remaining solvent from the coating film prior to the drying step. Consequently, this requires washing the film for a long period of time and repeated squeezing of the film. This makes the apparatus and method of manufacture complicated and expensive.

It is an object of the present invention to provide a method of forming self-sustaining and coating films having excellent moisture permeability and surface smoothness which is free from the disadvantages of the prior methods.

The porous film is formed by coagulating and precipitating polymeric material in a colloidal state by interaction among the polymeric material, a solvent and a non-solvent for the polymeric material, and it is very difficult to eliminate the solvent from the precipitated porous polymeric material. That is, the elimination of the solvent included and absorbed within the complicated porous structure of the colloidally coagulated and precipitated polymeric material becomes more and more difficult with the advance of washing with the non-solvent, as the concentration of the solvent in the coating layer, which will promote the diffusion of the solvent, decreases. This requires soaking in a non-solvent washing liquid for several hours or several times ten hours, if the elimination is carried out by leaving the coating film to soak in the washing liquid, so that it is necessary to squeeze the coating film by means of squeeze rolls or presses to eliminate the solvent contained in the porous structure.

It is, however, an indispensable condition for effectively performing the squeezing that the coagulated and precipitated porous coating film (primary gel) possess a mechanical strength sufficient to withstand the pressure imposed on it by means of squeeze rolls or presses. Accordingly, even in this case, a sufficient pre-washing time is needed to attain effective squeezing.

SUMMARY OF THE INVENTION

It has been discovered that the porous mass (primary gel) obtained by introducing a solution of polymeric material having dispersed therein a finely divided solid material in accordance with the present invention into a non-solvent to effect coagulation and precipitation of polymeric material is more porous than those formed from polymer solutions not containing any finely divided solid material dispersed therein, and that the incorporation of the finely divided solid material reduces the resistance to diffusion of the solvent which is included and absorbed in the porous structure and enhances the strength of the primary gel and, consequently, makes it possible to perform squeezing effectively. The present invention is performed based on these discoveries.

DETAILED DESCRIPTION OF THE INVENTION

The finely divided solid material will not serve the purpose of the present invention unless it satisfies the special conditions. For instance, leather flour, wood flour, milled fiber and like relatively large powdery materials which usually are added to polyurethane resin solution for the purpose of obtaining an artificial leather closely resembling natural leather in external appearance, drapability and touch, or very fine particles which are added to polymer solutions to provide the nuclei for coagulation of a polymer solution in a non-solvent, would not effectively serve the washing.

The present invention consists in the method of forming moisture permeable self-sustaining and coating films by applying a solution of polymeric material to a support or base material and soaking the support or base material having a coating layer of said solution in a liquid which is non-solvent for said polymeric material and said support or base material, but which is miscible with the solvent in said solution to effect coagulation and precipitation of polymeric material, in which process there is added to the solution of polymeric material a finely divided solid material of a particle size of from 0.1 micron to 300 microns which is substantially insoluble in said solvent and non-solvent, thereby reducing the time required for extraction of residual solvent.

Particles of the finely divided solid material suitably used in the practice of the present invention may be of the form of a sphere, ellipsoid, needle, column, or combinations thereof, and they may be agglomerated into secondary particles. The particle size of the finely divided solid may be measured directly by means of an electron or optical microscope or indirectly, e.g., by a precipitation method. In the specification, the term "particle of particle sizes of 0.1 micron to 300 microns" means particles having the smallest dimension of not less than 0.1 micron and the largest dimension not exceeding 300 microns. In cases of agglomerated particles, the largest diameter of the secondary particle may be as large as 500 microns, though preferred are those having a largest dimension not exceeding 300 microns. Particles having particle sizes of less than 0.1 micron exhibit insufficient reinforcing effect on the primary gel to make it possible to squeeze the primary gel effectively. On the other hand, those of particle size of more than 300 microns are difficult to disperse uniformly in the solution of polymeric material. It is essential for the solid material in finely divided form that it be sufficiently insoluble in both the solvent and non-solvent being employed.

The finely divided solid material to be employed in the present invention includes, for example, precipitated calcium carbonate and magnesium carbonate, usually employed as rubber additives, iron oxides, aluminum dust, titanium oxide and like finely divided inorganic solids and milled pulp and cellulose crystallite, and the like, but these examples are not limitative. The addition of the finely divided solid material to the solution of polymeric material may be carried out in any manner and there may be employed for this purpose, for example, an agitator or a propeller, turbine or ribbon-type and an ordinary colloid mill (homo-mixer). The finely divided solid material should be incorporated in an amount of at least 5% by weight of polymeric material in the solution to obtain an appreciable result, while it is undesirable to incorporate the finely divided solid material in amounts of more than 70% by weight because of the difficulty of obtaining uniform dispersion in the polymer solution and the increase in difficulties at the time of extending the resulting pigmented solution.

In the practice of the present invention there may be employed any of the soluble polymeric substances such as, e.g., nylon polyester, polyvinyl chloride, acrylonitrile copolymers and the like. In order to prepare especially flexible moisture permeable films, it is preferred to employ a segment copolymer prepared by reacting a diamine having two terminal primary amino groups with a polyalkylene ether, polyacetal or polyester having as terminal functional groups isocyanate, acyl halogenide, carbamyl halogenide or urea groups, to yield a so called polyester polyurethane or polyalkylene ether polyurethane. The diamine having two terminal primary amino groups includes hydrazine, hydrazine hydrate, ethylenediamine, 1,2-propylenediamine, tetramethylene diamine, m-xylylenediamine and like primary diamines. Flexible moisture permeable films may be obtained also by employing N-isopropylpoly (hexamethylene adipamide), N-methoxymethyl-poly (capramide) and like N-substituted polyamides, block copolyamides of poly(hexamethylene adipamide) with poly(capramide) and poly(ethylene sebacate terephthalate) and like copolyesters.

As the solvent for such polymers there may be used one selected from acetone, tetrahydrofuran, acetonitrile, N,N-dimethyl-formamide, N,N-diethylformamide, N,N-dimethylacetamide, tetramethylurea, dimethylsulfoxide, methanol, formic acid, m-cresol and others. Of course, any of the known solvents for each polymeric material to be employed may also be used.

As the non-solvent which is to be employed for coagulating and precipitating porous polymer from its solution there may be employed water, ethylene glycol, glycerol, methanol, ethanol and the like and mixtures thereof.

To the present invention may be given any special modification which is conventional in the manufacture of moisture permeable films by coagulation-precipitation processes. For instance, to the polymer solution there may be added a limited amount of a non-solvent for the polymer to convert the solution to a colloidal solution prior to application thereof to a casting surface, or, as the polymer solution, there may be employed a mixed solution of two or more polymers having different coagulating properties. Also, in these cases, by the incorporation of a finely divided solid material in the polymer solution in accordance with the present invention, there is promoted the elimination of the residual solvent from the coagulated porous mass by washing with a non-solvent.

A moisture permeable film is obtained by casting a polymer solution composition of the present invention on a metallic plate, plate glass, synthetic resin sheet or like support, coagulating and precipitating the polymer in a nonsolvent and, after washing, removing the support from the polymeric film thus formed. Alternately a moisture permeable artificial leather is obtained by applying to a web of woven, knitted, or non-woven fabric, or fleece, a polymer solution, containing a polymeric material which will form a flexible moisture permeable self-sustaining film or coating film and also incorporating a special finely divided solid material, in accordance with the present invention, coagulating and precipitating in a non-solvent and, after washing, drying the so coated fibrous base material.

The present invention will be fully illustrated by the following examples which are not limitative:

Example 1.—5 kg. (5 moles) of a poly(oxypropylene) glycol of a molecular weight of 1,000 was heated to 50° C., then there was added thereto 2.5 kg. (10 moles) of melted diphenylmethane-4,4′-diisocyanate. The reaction mixture thus formed was stirred at 80° C., for 1.5 hours in dry air to form an isocyanate-terminated prepolymer containing 5.30% of free isocyanate groups. After cooling to 30° C., 11.2 kg. of N,N-dimethylformamide was added to the reaction mixture to form a homogeneous solution. The solution was further cooled to 22° C., and, with cooling externally with water, to the solution was added, over a period of 10 minutes, a solution of 250 g. (4.2 moles) of ethylenediamine and 39 g. (0.3 mol) of di-n-butylamine in 3.0 kg. of N,N-dimethylformamide, with stirring. To the solution was then added 8 kg. of additional N,N-dimethylformamide to form a solution of a viscosity at 30° C., of 11,000 cps. containing 25% of the so formed polypropylene ether polyurea elastomer.

To separate portions of the solution there were added various finely divided solid materials, as listed in the following table, by means of a turbine-type mixer of 1,200 r.p.m. After de-aeration under reduced pressure, the solutions were separately cast on a plate glass to form a coating layer of 1.2 mm. thickness. The so called plate glass was immediately soaked in a lot of water at 35° C., to effect coagulation of the coating layer. After 5 minutes, the plate glass bearing the coating layer was withdrawn from the water bath and then soaked in a warm water at 65° C., for the periods of time as indicated in the following table, to extract residual solvent. The coating layer was then stripped off from the plate glass, squeezed by passing it 8 times between squeeze rollers under a linear pressure of 3 kg./cm., and dried at 100–105° C., in a circulating air dryer.

The results are summarized in the following table (Table 1):

TABLE 1

| Sample No.: | Finely divided solid materials | Particle sizes, microns | Added amount [1] | Condition of surface [3] | Time required for washing [3] | DMF permeability | Moisture permeability [5] |
|---|---|---|---|---|---|---|---|
| 1 | None | | 0 | Deformed | [6] 5 | $0.5 \times 10^{-8}$ | 350 |
| 2 | Precipitated calcium carbonate | 1.0 | 2 | Slightly deformed | [6] 1 | $1 \times 10^{-8}$ | 415 |
| 3 | do | 1.0 | 5 | Unchanged | [7] 40 | $6 \times 10^{-8}$ | 400 |
| 4 | do | 1.0 | 30 | do | [7] 7 | $20 \times 10^{-8}$ | 943 |
| 5 | Hakuenka AC (CaCO$_3$) | 0.04 | 30 | Slightly deformed | [7] 90 | $1 \times 10^{-8}$ | 370 |
| 6 | Hakuenka O (CaCO$_3$) | 0.03 | 30 | do | [7] 90 | $1 \times 10^{-8}$ | 262 |
| 7 | Hakuenka AA (CaCO$_3$.MgCO$_3$) | 0.05 | 30 | do | [7] 90 | $1 \times 10^{-8}$ | 294 |
| 8 | Hakuenka A (CaCO$_3$.MgCO$_3$) | 1.0 | 30 | Unchanged | [7] 10 | $11 \times 10^{-8}$ | 740 |
| 9 | Heavy calcium carbonate | 8.3 | 30 | do | [7] 7 | $23 \times 10^{-8}$ | 1,030 |
| 10 | Mapico-EG4 [8] | 0.2–1.0 | 25 | do | [7] 15 | $8 \times 10^{-8}$ | 950 |
| 11 | Avicel [9] | 1–100 | 30 | do | [7] 10 | $13 \times 10^{-8}$ | 870 |
| 12 | KC flock [10] | 30–200 | 30 | do | [7] 10 | $9 \times 10^{-8}$ | 720 |

NOTES:
[1] Parts by weight per 100 parts by weight of polymer.
[2] Conditions of surface indicate the degree of deformation of a coagulated film after soaking in warm water at 60° C., for 10 minutes and then passing between squeeze rollers under a linear pressure of 3 kg./cm.
[3] Time required for washing indicates the soaking time in warm water at 65° C., for a coagulated film for substantially complete elimination or extraction of residual solvent from the coagulated film to make it capable of being dried without any trouble.
[4] DMF permeability (cu.cm./sec.) indicates the rate of permeation of N,N-dimethylformamide through an undried film measured by sealing the bottom of a column of an inner diameter of 35 mm. with the film, charging into the column 50 g. of a 20/80 mixture of water and N,N-dimethylformamide and holding the bottom of the column and in contact with 30 g. of water to allow N,N-dimethylformamide within the column diffuse through the film into the water.
[5] Moisture permeability (g. H$_2$O/sq.m., 24 hr.), measured according to JIS (Japanese Industrial Standard) Z 208.
[6] Hours.
[7] Minutes.
[8] Ba0.6Fe$_2$O$_3$, produced and put on market under trade name "Mapico-EG4" by Columbia Carbon Co.
[9] Cellulose crystallite put on market by Asahi Chemical Industry Co. Ltd., under the trade name.
[10] Wood pulp flour put on market by Kokusaku Pulp Co. Ltd. under the trade name.

Example 2.—To 400 parts by weight of 25% solution of polypropylene ether polyurea elastomer in N,N-dimethylformamide, prepared in the manner as in Example 1, there were added 10 parts by weight of polyvinyl chloride and 25 parts by weight of a precipiated calcium carbonate, and the resulting mixture was thoroughly homogenized by means of a homo-mixer. The dope thus formed was de-aerated under reduced pressure and then applied to a base material to form a coating layer of 1.5 mm. thickness thereon. The coated material was immediately soaked in water at 35° C. and, after 5 minutes, withdrawn from water and then soaked in warm water at 65° C., for 10 minutes. The coated material was then passed ten times through squeeze rolls under a linear pressure of 4 kg./cm. and dried at 100–105° C. The base material employed in this example was such that had been prepared by impregnating a cotton flannel with a 12% N,N-dimethylformamide solution of a polyurea elastomer prepared in the manner as in Example 1 and, after washing with water to coagulate the polymer and eliminate the solvent, drying the so treated web.

A pliant artificial leather was obtained by subjecting the so coated base material to an ordinary coating finish and buffing the uncoated side of the base material. The artificial leather thus obtained exhibited a moisture permeability of as high as 1,300 g. H$_2$O/sq.m., 24 hrs. (JIS Z 208).

On the other hand, in cases where the precipitated calcium carbonate was not added to the polymer solution, surface smoothness of the coagulated polymer layer was damaged on drying even if the coated base material was soaked in warm water at 65° C., for 40 minutes or more.

As mentioned above, according to the present invention, the time required for washing is remarkably reduced as indicated by Table 1 and there are obtained products of good quality.

What is claimed is:
1. In the method for forming a flexible moisture permeable self-sustaining or coating film by applying a solution of a polymer selected from the group consisting of segment copolymers prepared by reacting an essentially bi-functional compound containing terminal primary amino groups with an essentially bi-functional member from the group consisting of a polyalkylene ether, polyacetal and polyester compound containing terminal isocyanate groups to a substrate and soaking the thus coated substrate in a liquid which is a non-solvent for said polymer and said substrate but is miscible with the solvent for said polymer to coagulate and precipitate the polymer, the improvement which comprises incorporating in the polymer solution from about 5 to about 70% by weight, based on the weight of the polymer in said polymer solution, of a finely divided solid material selected from the group consisting of precipitated calcium carbonate, magnesium carbonate, iron oxide, titanium oxide, aluminum dust, milled pulp and cellulose crystallite, said finely divided solid material having a particle size the smallest dimensions of which are not less than 0.1 micron and the largest dimensions of which are not greater than 300 microns, said material being substantially insoluble in said solvent and said non-solvent.

2. The method of claim 1 further comprising stripping said film from said substrate to provide a self-supporting film.

3. The method of claim 1 in which the solvent for said polymer is a member of the group consisting of acetone, tetrahydrofuran, acetonitrile, N,N-dimethylformamide, N,N-dimethylacetamide, N,N-diethylformamide, tetramethylurea, dimethylsulfoxide, methanol, formic acid and meta-cresol.

4. The method of claim 1 in which the coagulating liquid is selected from the group consisting of water, ethylene glycol, glycerol, methanol and ethanol.

5. The method of claim 1 in which the essentially bifunctional compound containing terminal primary amino groups is selected from the group consisting of hydrazine hydrate, ethylenediamine, 1,2-propylene-diamine, tetramethylene-diamine and m-xylylene diamine.

6. The process of claim 1, which further comprises drying said polymer after said coagulation and precipitation while said polymer is substantially free of residual solvent.

References Cited

UNITED STATES PATENTS

| 3,100,721 | 8/1963 | Holden | 117—63X |
| 3,190,765 | 6/1965 | Yuan | 264—216X |
| 3,296,016 | 1/1967 | Murphy | 264—49X |
| 3,369,925 | 2/1968 | Matsushita et al. | 260—77.5(MP) |
| 3,418,168 | 12/1968 | Wentworth | 264—49X |

FOREIGN PATENTS

| 639,553 | 4/1962 | Canada | 264—41 |

OTHER REFERENCES

Oleesky, Samuel S.: Handbook of Reinforced Plastics of the Society of the Plastic Industry, Inc., New York, Reinhold, 1964, pp. 224, 229, 230, 244, 245.

PHILIP E. ANDERSON, Primary Examiner

U.S. Cl. X.R.

117—63, 135.5; 161—159; 260—2.5, 40, 77.5; 264—216